United States Patent [19]

Newell

[11] 4,403,696
[45] Sep. 13, 1983

[54] ENVELOPE

[75] Inventor: William C. Newell, Spokane, Wash.

[73] Assignee: I-Tron, Inc., Spokane, Wash.

[21] Appl. No.: 31,503

[22] Filed: Apr. 19, 1979

[51] Int. Cl.³ .................... B65D 27/06; B65D 27/34
[52] U.S. Cl. ................................ 206/623; 206/610; 206/625; 229/69; 229/73
[58] Field of Search ............... 206/625, 623, 610, 611; 229/69, 73

[56] References Cited

U.S. PATENT DOCUMENTS

| 702,100 | 6/1902 | Keller | 206/610 |
| 3,062,431 | 11/1962 | Rabenold | 229/73 |
| 3,411,699 | 11/1968 | Pine et al. | 229/73 X |
| 3,554,438 | 1/1971 | Van Malderghem | 229/73 X |
| 3,747,837 | 7/1973 | Wilson | 229/73 |
| 3,854,654 | 12/1974 | Van Malderghem | 229/69 |
| 3,952,942 | 4/1976 | O'Leary et al. | 229/73 X |
| 4,190,162 | 2/1980 | Buescher | 206/625 |

FOREIGN PATENT DOCUMENTS 1180 3/1979 European Pat. Off. ............... 229/73

Primary Examiner—Stephen P. Garbe
Attorney, Agent, or Firm—Wells, St. John & Roberts

[57] ABSTRACT

The envelope assembly comprises a rectangular front panel and a complementary back panel which together form an envelope for initial use in the delivery of an insert. First and second tear lines are formed across the two panels, respectively. The first tear line, formed across the front panel, is spaced inwardly from one side of the envelope a distance greater than the corresponding separation between the second tear line and the one side of the envelope. An insert formed within the envelope is secured between the front and back panels along said one side. By pinching the envelope and exerting a pulling force on it, from its opposite sides, the envelope can be burst. This separates the insert and a removable portion of the envelope along the first and second tear lines. The separation between the first and second tear lines exposes a portion of the back panel that extends outwardly from the first tear line. The extended portion of the back panel is foldable over the first tear line and front panel as a covering flap, enabling the envelope to be used a second time. Additional inserts can be included as part of the reusable envelope portion. The remainder of the envelope includes third and fourth tear lines of greater bursting strength than the first and second tear lines. These are used to separate the reused envelope in two for opening purposes.

18 Claims, 17 Drawing Figures

ENVELOPE

BACKGROUND OF THE INVENTION

1. Prior Art

U.S. Pat. No. 3,554,438 to Van Malderghem discloses a manifolded envelope and data sheet combination including top and bottom envelope members and one or more intervening insert members. The insert members are secured to a removable side of each envelope and are removed from the envelope when it is burst by a rapid pulling action. The inserts within the original envelope might include a separable return envelope as well as one or more data sheets.

U.S. Pat. No. 3,854,654 to Van Malderghem also discloses an assembly of stuffed envelopes. This assembly includes transfer materials attached to a removable tear strip at one envelope end. The removable tear strip and transfer materials are removed from the envelope following its imprinting, and the envelope is resealed before being sent to the intended recipient. A second tear strip is provided to assist in the ultimate opening of the envelope.

2. Field of the Invention

This invention relates to stuffed envelopes of the type adaptable to construction from continuous webs of paper. The envelopes are provided in a multiple form and are prestuffed prior to imprinting information on inserts sealed within them. The invention relates to the envelope and included business forms as an individual unit, it being understood that these units are contemplated to be produced as a connection series of units which can be fed through office machines for imprinting either as a continuous series or as individual units.

The prestuffed mailing envelope and incorporated return envelope feature disclosed herein has potential applications in many business systems, including the mailing of invoices and statements, utility bills, promotional mailings, grade reports, fund raising efforts and tax billing.

Prior developments relating to prestuffed manifold type envelopes have utilized separable return envelopes included as inserts in the assembly. Since the return envelope must be free for removal from the principal envelope structure, this necessitates that the retun envelope width be less than that of the principal envelope structure. This reduced width either impairs the usefulness of the return envelope or requires greater than normal width in the principal envelope structure. It also adds to the cost of the assembly by requiring the addition of at least two more layers or webs of paper within the assembly thn would be the case if the return envelope were not included within it.

It is one object of this invention to provide a stuffed envelope assembly for initial use in the delivery of a removable insert where the outer envelope is structured so that it can be reused after its opening and removal of the insert.

Another feature of novelty is a stuffed envelope with a combination of both removable inserts and retained inserts.

Additional features of the envelope will be apparent from a study of the following description of the preferred embodiment and the accompanying drawings that illustrate that embodiment by way of example.

DESCRIPTION OF THE PREFERRED EMBODIMENT

The stuffed envelope assembly described below is designed for initial delivery of a primary insert or inserts and for return delivery of a secondary insert or inserts, using common envelope panels for both initial use and return use purposes. The front panel of the envelope assembly carries initial addressee information and the back panel carries return addressee information.

Figure 1:
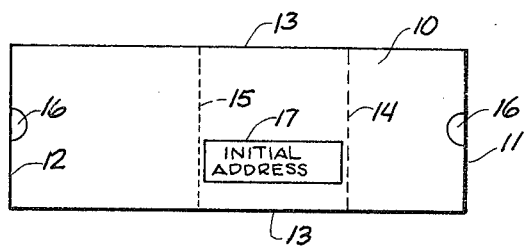
FIG. 1 is a front view of the envelope assembly.
Figure 6:
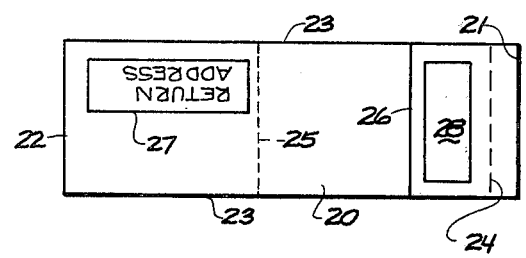
FIG. 6 is a rear view of the envelope assembly.

The completed envelope assembly is shown as a unit in FIGS. 1 and 6. It is completely enclosed within parallel outer panels, specifically identified as a first or front panel 10 and a second or back panel 20. The two panels 10, 20 overlie one another. Each has an outside surface (shown in FIGS. 1 and 6, respectively) and an inside surface (shown in FIGS. 2 and 7, respectively). Their inside surfaces face toward one another.

The respective sides of the front panel 10 include parallel end margins 11, 12 and perpendicular top and bottom margins 13. The back panel 20 includes corresponding end margins 21, 22 and top and bottom margins 23. End margins 11, 21 are in registration with one another as are the opposite end margins 12, 22 and the respective top and bottom margins 13, 23.

In the preferred construction of the envelope assembly, it will be fabricated in a manifold series of unit envelopes arranged parallel to one another in a continuous strip. The various panels and inserts described herein would be die cut and arranged in a manner common to other manifold envelope assemblies. Marginal strips (not shown) would be included outwardly adjacent the end margins 11, 12 and 21, 22. These marginal strips would include suitable feed holes by which the strips or webs can be fed through machines for imprinting and handling purposes. The top and bottom margins 13 and 23, would be transverse perforated lines capable of separating the individual envelopes for unit use. The details of such manifold envelope assemblies are well known and not directly pertinent to an understanding of the present improvement. An example of such construction is illustrated in U.S. Pat. No. 3,554,438, which is hereby incorporated within this disclosure by reference.

The front and back panels 10, 20 have first and second perforated tear lines 14, 24 formed respectively across them at locations near one corresponding end margin 11, 21 of each panel. The location of the first tear line 14 across panel 10 is spaced inwardly from the panel end margin 11 a distance greater than the distance between the second tear line 24 and the corresponding end margin 21 of panel 20. This difference in spacing creates a foldable flap that remains after removal of the primary insert and materials from the envelope assembly when it is initially burst.

The panels 10 and 20 also include third and fourth tear lines 15, 25, respectively. They are arranged parallel to the first and second tear lines 14, 24. Each is positioned intermediate the location of the first tear line 14 and the end margins 12, 22. The tear lines 15, 25 are slightly offset to the side of one another in order that the perforations across them do not create a weakened plane through the completed envelope assembly.

The front panel 10 is provided with imprinted thumb notches 16 at its respective sides. These serve as visual indicators to the receiver of the envelope assembly as to the envelope areas at each side which are to be pinched during bursting of the envelope. They assist in maintaining proper pressure across the plies of the envelope assembly to assure that each remains intact with the portions of it which are separable from one another. The front panel 10 also includes a legend area 17 in which would be imprinted information concerning the initial addressee or receiver of the complete envelope assembly.

The back panel 20 includes a fold line 26 which can be perforated or scored to facilitate bending of the flap remaining after separation of the removable portion of the envelope by the initial addressee. The fold line 26 is in substantial registration with the first tear line 14. The back panel 20 includes a legend area 27 for identification of the return addressee.

Panel 20 also includes a flap legend 28 located between the fold line 26 and the second tear line 24 of the envelope assembly. This legend area should preferably include instructions concerning identification of the sequential addressees, since the completed envelope assembly will include initial addressee information in the legend area 17 as well as return addressee information in the legend area 27. To eliminate confusion, the flap legend at 28 might read "Please deliver this envelope to address on reverse side" or a similar instruction. This common instruction is applicable to both initial delivery of the envelope as well as its reuse.

The tear lines 14, 24 define a removable portion of the envelope (shown to the right in FIGS. 1 and 6) that includes one corresponding end margin 11, 21 of each panel 10, 20. It is adapted to be grasped and pulled in opposition to the opposite end margins 12, 22 for bursting the complete envelope assembly.

The term "primary insert" is used herein to describe an informational sheet or panel which is to be delivered to the initial addressee. This will normally be a single sheet, which can be preprinted on one or both sides, and can be imprinted through the exterior of the envelope assembly without disturbing its contents. The primary inserts are removed from the completed envelope assembly when the initial addressee bursts it. The primary insert can include duplicate copies which are later reinserted into the remainder of the envelope in preparation for its reuse. However, it is preferable that the envelope assembly further include secondary inserts or duplicates, which remain within the envelope and are returned to the sender.

Included with the completed envelope assembly is a primary insert 30. It includes an integral stub 31 at one end and a separable stub 36 at its opposite end. The integral stub 31 includes an insert margin 37 in registration with the end margins 11, 21. Separable stub 36 includes an insert margin 38 in registration with the end margins 12, 22 previously described. Stub 36 is joined to the primary insert 30 by a perforated keen line 32, which facilitates easy detachment of insert 30. The upper and lower boundaries of the primary insert 30 are cropped, permitting insert 30 to be sandwiched between panels 10, 20 without attachment to them.

It is to be understood that there can be one or a plurality of primary inserts 30 within the completed envelope assembly, depending upon the amount and nature of information to be conveyed to the initial addressee.

Figure 3:
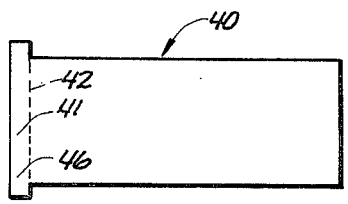
FIG. 3 is a front view of a secondary insert.
Figure 4:
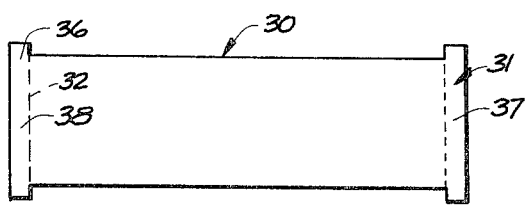
FIG. 4 is a front view of a primary insert.

A secondary insert is shown in FIG. 3 and is identified by the numeral 40. It includes a supporting stub 41 at one end, bounded by an insert margin 46 in registration with the end margins 12, 22. The stub 41 and insert 40 are joined across a perforated keen line 42. The secondary insert 40 is also cropped along its top and bottom margins so as to be free within the assembled envelope assembly. Its right hand end is cropped across an outer margin 47 in substantial registration with the first tear line 14 and fold line 26. The boundaries of the secondary insert 40 are therefore within the boundaries defined by the end margins 11, 21 and the first tear line 14.

Figure 5:
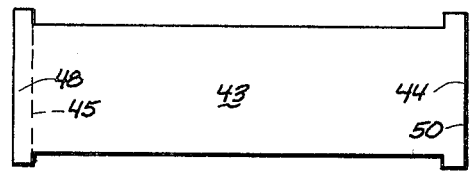
FIG. 5 is a front view of a sheet of transfer material.

To facilitate imprinting of information on the primary and secondary inserts 30, 40 from the exterior of the completed envelope assembly, there are sheets of carbon paper or other transfer material overlying the inert surfaces. An examplary transfer material sheet 43 is shown in FIG. 5. It includes an integral stub 44 and a separable stub 48. The separable stub 48 is defined along a perforated keen line 45 separating the main body of sheet 43 from the stub 48. The integral stub 44 extends to an outer margin 50 arranged in registration with the previously described end margins 11, 21. The main portion of the transfer material sheet 43 is cropped along its top and bottom margins so as to correspond in width to the inserts 30, 40. The transfer material sheets 43 are designed for removal along with the initial removable portion of the envelope assembly.

The various plies of the envelope assembly are secured to one another in overlying flat positions in a manner familiar to those skilled in the design and construction of manifold series envelopes for machine imprinting. The areas of the various plies adjacent to the end margins are secured to one another by end stream paste lines 33. The paste lines 33 at the right hand side of the complete envelope assembly as shown in the drawings connect the elements that comprise the removable portion of the envelope. The opposite end stream paste lines 33 connect the elements that comprise the reusable portion of the envelope. The top and bottom margins 13, 23 of the front and back panels 10, 20 are secured to one another by transverse stream paste lines 34.

Figure 2:
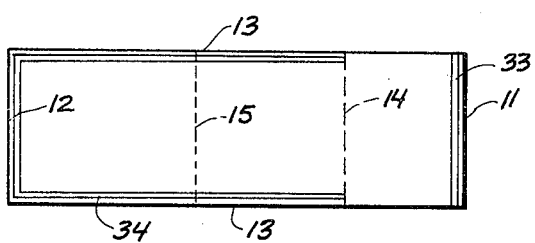
FIG. 2 is a back view of the front panel.
Figure 7:
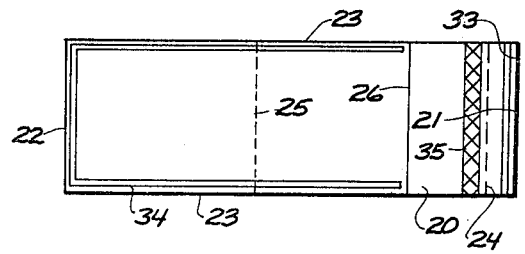
FIG. 7 is a front view of the back panel.

As can be seen in FIGS. 2 and 7, the transverse stream paste lines 34 extend between the end margins 12, 22 (and the insert margins in registration with them) and the first tear line 14. The locations of the transverse stream paste lines 34 are outside the cropped boundaries of inserts 30, 40 and sheets 43. Paste lines 34 do not extend across the flap formed on the back panel 20 between fold line 26 and the second tear line 24. The lack of an adhesive connection between the panels 10, 20 across this relatively short section does not materially affect the integrity of the completed envelope assembly.

Suitable sealing adhesive 35 is provided in a transverse strip across the inside surface of back panel 20 inwardly adjacent to the second tear line 24 (see FIG. 7). It might comprise a pressure sensitive adhesive with a removable protective sheet (not shown), or an adhesive adapted to be moistened for sealing purposes. The adhesive area 35 is utilized to secure the covering flap during reuse of the envelope. It then secures the flap to the outside surface of front panel 10.

FIGS. 8 through 11 are schematic side views that illustrate the layering of the various plies in the envelope assembly during its successive stages of use. These figures illustrate the end paste lines, the tear lines, and the positioning of the margins of the respective layers or plies. The transverse paste lines 33 are designated by crossed construction lines. The tear lines and keen lines are indicated by intersecting construction lines. Arrows 52 and 53 indicate the pinch points of the fingers of the users at the ends of the envelope. Arrows 54 indicate relative movement between the portions of the envelope.

Figure 8:
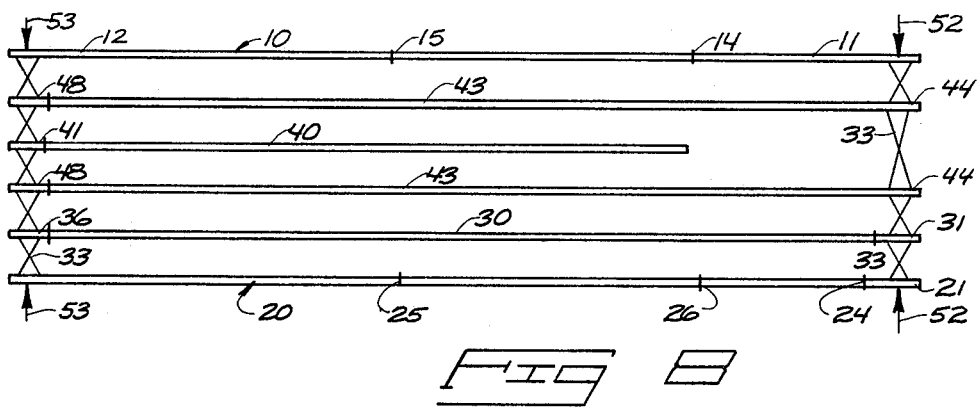
FIG. 8 is a schematic side view of the complete envelope assembly.

Referring specifically to FIG. 8, the layers of the complete envelope assembly can be seen in a sequential arrangement from front (top) to back (bottom). These include front panel 10, a transfer material sheet 43, a secondary insert 40, another transfer material sheet 43, the primary insert 30, and back panel 20. Their respective end margins are in registration as previously described, and the areas adjacent the end margins in registration with one another are secured by paste lines 33.

Figure 9:
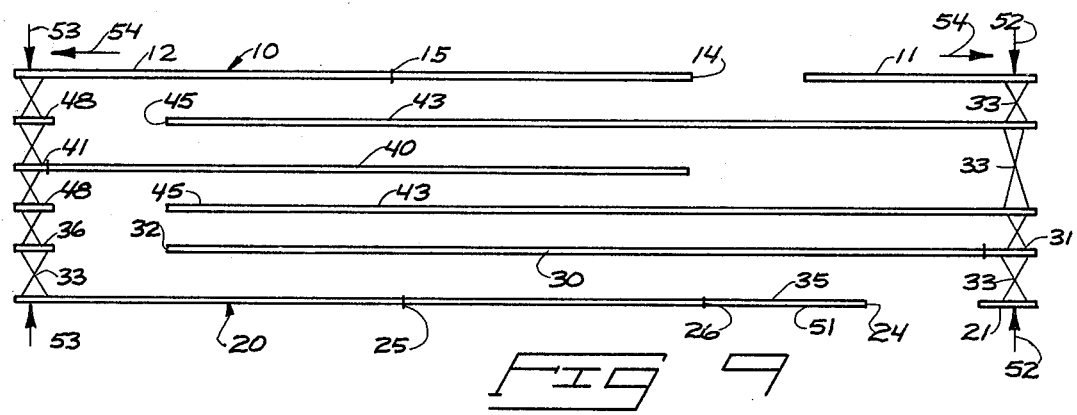
FIG. 9 is a similar view just after bursting of the envelope assembly.

Because the first and second tear lines 14, 24 have a lesser bursting strength than the third and fourth tear lines 15, 25, the assembly will initially burst as shown in FIG. 9. The front panel 10 will be separated across its first tear line 14. The back panel 20 will be separated across its second tear line 24. The transfer material sheets 43 will be separated across their perforated keen lines 45. The primary insert 30 will be separated from its perforated keen line 32. The portions of front panel 10 to each side of the third tear line 15 will remain intact, as will the portions to each side of the fourth tear line 25 across the back panel 20. The secondary insert 40 will remain attached to its supporting stub 41 by the perforated keen line 42.

Figure 10:
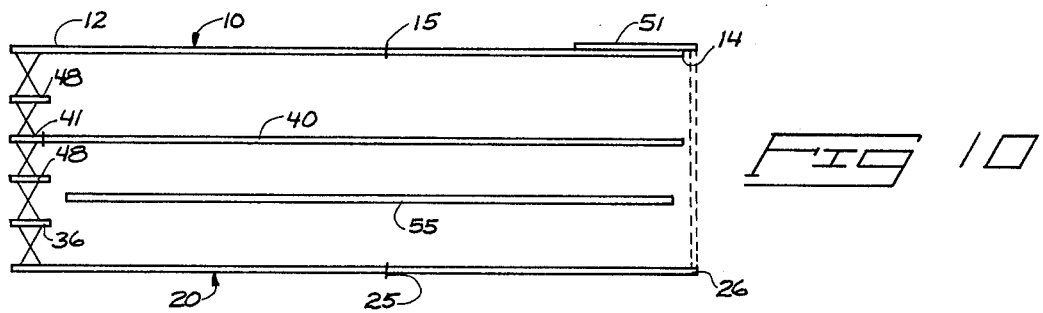
FIG. 10 is a schematic side view of the envelope assembly during reuse.

FIG. 10 shows the remainder of the envelope assembly prepared for use as a return envelope. The flap 51 has been folded over the first tear line 14 on front panel 10 to close the previously opened end of the envelope. The secondary insert 40 remains sandwiched between the front and back panels 10, 20. Further sheets of materials totally unconnected to the envelope elements can be included as shown at 55. Sheet 55 might be a check drawn in payment of a bill imprinted on the primary insert 30 and related to the information recorded on the secondary insert 40, or can be one or more other related sheets of information or data which are to be returned to the sender.

Figure 11:
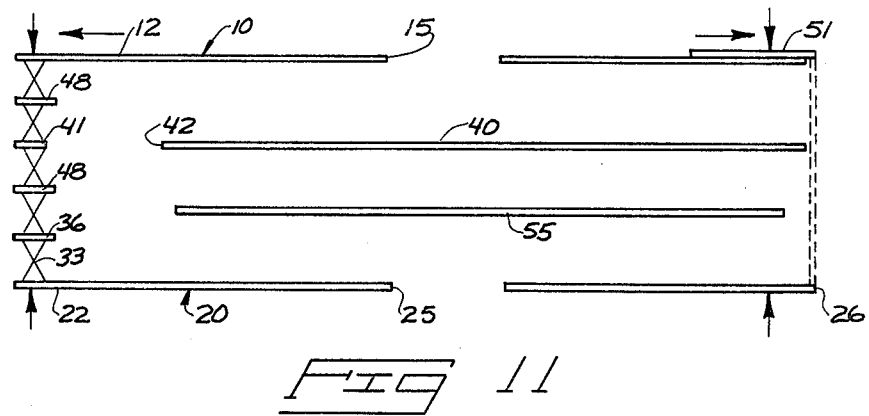
FIG. 11 is a similar view just after bursting of the reused envelope assembly.

FIG. 11 shows the bursting of the reused envelope. The front panel 10 separates across the third tear line 15. The back panel 20 separates across the fourth tear line 25. The secondary insert 40 separates across the keen line 42 and is now free from both sections of the envelope assembly. The secondary insert 40 can then be readily removed and processed along with the other enclosed sheets 55.

Figure 12:
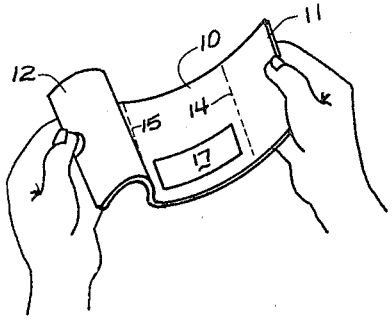
FIG. 12 is a perspective view showing the gripping of the complete envelope assembly.
Figure 13:
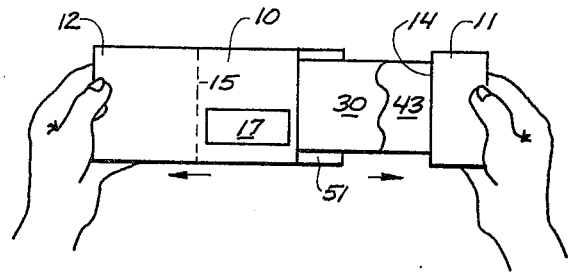
FIG. 13 is a perspective view showing bursting of the complete envelope assembly.

FIGS. 12 through 17 are perspective views illustrating manual handling of the envelope elements during its sequence of usage. FIG. 12 shows the complete envelope assembly grasped by the initial receiver in preparation for bursting of the envelope across the first and second tear lines 14, 24. FIG. 13 illustrates bursting of the complete envelope assembly, exposing the primary insert 30 which contains informational data directed to the addressee.

Figure 14:
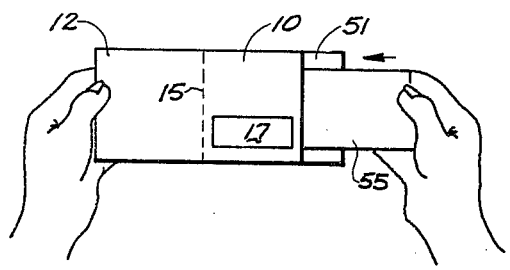
FIG. 14 is a perspective view showing insertion of the return materials.
Figure 15:
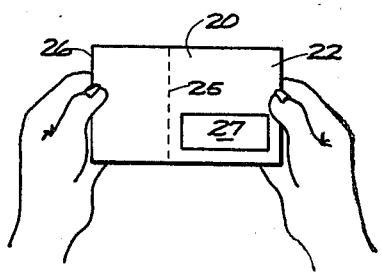
FIG. 15 is a perspective view showing the closing of the envelope for reuse.

FIG. 14 illustrates the insertion of a sheet 55 (such as a payment check) into the open end of the envelope. FIG. 15 illustrates the folding of flap 51 to seal the return envelope in preparation for reuse.

Figure 16:
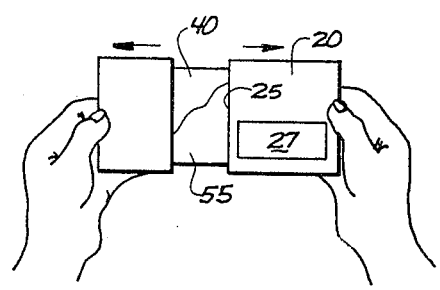
FIG. 16 is a perspective view showing bursting of the reused envelope.
Figure 17:
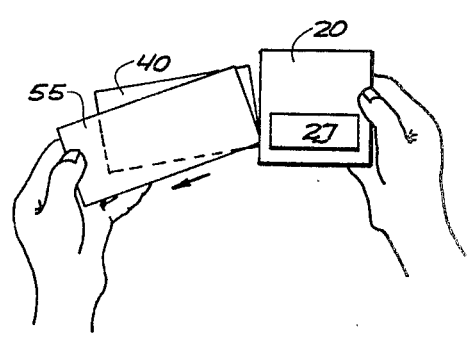
FIG. 17 is a perspective view showing removal of the secondary insert.

FIG. 16 shows bursting of the return envelope across the third and fourth tear lines 15, 25, exposing the separated secondary insert 40 and underlying sheet 55 or other materials included within the return envelope. FIG. 17 illustrates the removal of the secondary insert 40 and other insert sheets 55 from one of the portions of the opened return envelope.

Various modifications might be made with respect to the envelope assembly without departing from its essential structure. As one example, the sheets of transfer material can be removed prior to sealing one end of the completed envelope assembly, as is taught in prior U.S. Pat. No. 3,854,654.

The envelope lends itself to use as a single unit or as a continuous series of envelopes fed from a roll or in a manifold condition. The envelope can be utilized with equipment that imprints information on the inserts at the site of its initial delivery, or it can be used for printing at a remote location and delivery by mail or other suitable systems to the initial addressee.

Having described my invention, I claim:
1. A reusable stuffed envelope assembly for initial use in the delivery of an insert, comprising:
   a front panel and a back panel overlying and secured to one another, the panels each having an inside surface and an outside surface;
   a first tear line across the front panel;
   a second tear line across the back panel;
   the first tear line being spaced inwardly from one side edge of the envelope a distance greater than the distance between the second tear line and the one side edge of the envelope;
   said first and second tear lines defining a removable portion of the envelope that includes said one side edge thereof and which is adapted to be grasped in pulling opposition to the opposite side edge of the envelope for bursting the envelope by separation of the removable portion from the remainder of the envelope along said first and second tear lines;
   a primary insert sandwiched between the front and back panels adjacent the one side edge of the envelope, whereby the primary insert is grasped and removed from the envelope conjointly with separation of the removable portion of the envelope;
   the back panel including a portion that extends outward from the first tear line after separation of the insert and the removable portion of the envelope from the remainder of the envelope, the extended portion of the back panel being foldable over the first tear line and front panel as a covering flap to enable the remainder of the envelope to be reusable;

said front and back panels further including third and fourth tear lines respectively, said third and fourth tear lines being formed across the panels at positions intermediate the location of the first tear line and said opposite side edge of the envelope.

2. An assembly as set out in claim 1 wherein the bursting strength of the third and fourth tear lines being greater than the bursting strength of the first and second tear lines.

3. An assembly as set out in claim 1 wherein said third and fourth tear lines are parallel to the first and second tear lines;

the bursting strength of the third and fourth tear lines being greater than the bursting strength of the first and second tear lines.

4. An assembly as set out in claim 1 wherein said third and fourth tear lines are parallel to the first and second tear lines;

said third and fourth tear lines being offset to the side of one another;

the bursting strength of the third and fourth tear lines being greater than the bursting strength of the first and second tear lines.

5. An assembly as set out in claim 1 wherein the back panel has a fold line formed across it in substantial registration with the first tear line.

6. An assembly as set out in claim 1 wherein the back panel has a fold line formed across it in substantial registration with the first tear line; and means on the inside surface of the back panel at a location inwardly adjacent the second tear line for selectively securing the folded covering flap to the outside surface of the front panel.

7. An assembly as set out in claim 1 further comprising: a secondary insert within the envelope, said secondary insert being sandwiched between the front and back panels adjacent said opposite side edge of the envelope.

8. An assembly as set out in claim 1 further comprising:

a secondary insert within the envelope, said secondary insert being sandwiched between the front and back panels adjacent said opposite side edge of the envelope; and a transfer sheet interposed between said front panel and the primary insert, said transfer sheet being sandwiched between the front and back panels adjacent the one side edge of the envelope whereby the transfer sheet is grasped and removed from the envelope conjointly with separation of the primary insert and removable portion of the envelope.

9. An assembly as set out in claim 1 further comprising:

a secondary insert within the envelope, said secondary insert being sandwiched between the front and back panels adjacent said opposite side edge of the envelope; and first and second transfer sheets interposed respectively between said front panel and the primary insert and between the primary insert and the secondary insert, both of said first and back panels adjacent the one side edge of the envelope, whereby they are grasped and removed from the envelope conjointly with separation of the primary insert and removable portion of the envelope.

10. A reusable stuffed envelope assembly for initial use in the delivery of an insert, comprising:

a first panel and a second panel having identical rectangular configurations, said panels each having an inside surface and an outside surface, said panels overlying one another with the corresponding margins thereof in registration with one another and with the inside surfaces thereof facing toward one another;

a first tear line formed across the first panel parallel to a first margin thereof;

a second tear line formed across the second panel parallel to the corresponding first margin thereof;

the first tear line being spaced inwardly from the first panel margins a distance greater than the distance between the second tear line and the first panel margins;

said first and second tear lines defining a removable portion of the envelope that includes the first panel margins and which is adapted to be grasped in pulling opposition to the opposite panel margins for bursting the envelope by separation of the removable portion from the remainder of the envelope along said first and second tear lines;

a primary insert interposed between the first and second panels having an insert margin in registration with the first panel margins;

means securing said first and second panels and said primary insert to one another in an area within the space separating said first panel margins and the second tear line for removal of the insert from the envelope conjointly with separation of the removable portion of the envelope;

the second panel including a portion that extends outward from the first tear line after separation of the insert and removable portion of the envelope from the remainder of the envelope, the extended portion of the second panel being foldable over the first tear line and first panel as a covering flap to enable the remainder of the envelope to be usable a second time; and said first and second panels furthr including third and fourth tear lines respectively, said third and fourth tear lines being parallel to the first panel margins and being formed across the panels at positions intermediate the location of the first tear line and said opposite panel margins.

11. An assembly as set out in claim 10 wherein the first and second panels are further secured to one another about their remaining margins about areas located outside the boundaries of the primary insert and between the opposite panel margins and the first tear line.

12. An assembly as set out in claim 10 wherein the bursting strength of the third and fourth tear lines is greater than the bursting strength of the first and second tear lines.

13. An assembly as set out in claim 10 wherein the second panel has a fold line formed across it in substantial registration with the first tear line; and means on the inside surface of the second panel at a location inwardly adjacent the second tear line for selectively securing the covering flap to the outside surface of the first panel.

14. An assembly as set out in claim 10 further comprising:

a secondary insert interposed between the first and second panels having an insert margin in registration with the opposite panel margins.

15. An assembly as set out in claim 10 further comprising:
    a secondary insert interposed between the first and second panels having an insert margin in registration with the opposite panel margins; and
    means securing said first and second panels and said secondary insert to one another adjacent said opposite panel margins.

16. An assembly as set out in claim 15 wherein the first and second panels are further secured to one another about their remaining margins about areas located outside the boundaries of the primary and secondary inserts and between the opposite panel margins and the first tear line.

17. An assembly as set out in claim 10 further comprising:
    a transfer sheet interposed between said first panel and the primary insert, said transfer sheet being sandwiched between the first and second panels with an outer margin in registration with the first panel margins, whereby the transfer sheet is grasped and removed from the envelope conjointly with separation of the removable portion of the envelope.

18. An assembly as set out in claim 10 further comprising:
    a secondary insert interposed between the first and second panels having an insert margin in registration with the opposite panel margins; and
    first and second transfer sheets interposed respectively between said first panel and the primary insert and between the primary insert and the secondary insert, both of said first and second transfer sheets being sandwiched between the first and second panels with outer margins of the respective transfer sheets in registration with the first panel margins, whereby they are grasped and removed from the envelope conjointly with separation of the removable portion of the envelope.

* * * * *